(12) United States Patent
Cowgill et al.

(10) Patent No.: US 7,778,766 B1
(45) Date of Patent: Aug. 17, 2010

(54) DIAGNOSTIC SYSTEMS AND METHODS USING NITROGEN OXIDE SENSORS

(75) Inventors: Joshua D. Cowgill, Hartland, MI (US); Scot A. Douglas, Howell, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/546,273

(22) Filed: Aug. 24, 2009

(51) Int. Cl.
*G01M 15/10* (2006.01)

(52) U.S. Cl. .............. 701/108; 123/568.14; 123/90.15; 123/703; 73/114.71; 73/114.74; 73/114.79

(58) Field of Classification Search .......... 123/703, 123/568.14, 90.15–90.18; 701/108, 114; 73/114.71, 114.74, 114.79
See application file for complete search history.

(56) References Cited

U.S. PATENT DOCUMENTS

| 5,060,604 | A  | * | 10/1991 | Seki et al. ............... 123/90.16 |
| 7,204,132 | B2 | * | 4/2007 | Reed et al. ............... 73/114.79 |
| 2002/0007668 | A1 | * | 1/2002 | Maruta et al. ............ 73/116 |
| 2006/0212210 | A1 | * | 9/2006 | Daneau et al. ............ 701/109 |

* cited by examiner

*Primary Examiner*—Erick Solis (57) ABSTRACT

An engine system includes a nitrogen oxide (NOx) estimation module and a diagnostic module. The NOx estimation module estimates an amount of NOx in an exhaust gas produced by an engine based on a predetermined function of a position of at least one of a camshaft phaser and an exhaust gas recirculation (EGR) valve. The diagnostic module determines a state of at least one of the camshaft phaser and the EGR valve based on a predetermined threshold and a difference between the estimated amount of NOx and an actual amount of NOx in the exhaust gas measured by a NOx sensor.

20 Claims, 8 Drawing Sheets

DIAGNOSTIC SYSTEMS AND METHODS USING NITROGEN OXIDE SENSORS

FIELD

The present disclosure relates to internal combustion engines and more particularly to diagnostic systems and methods using nitrogen oxide (NOx) sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to generate drive torque. The combustion of the A/F mixture produces exhaust gas that may be expelled from the cylinders through an exhaust manifold and an exhaust system. The exhaust system may include components to treat the exhaust gas to reduce emissions. For example, the exhaust gas may include nitrogen oxides (NOx). Components that treat exhaust gas may include, but are not limited to, external exhaust gas recirculation (EGR) systems, catalytic converters, and selective catalytic reduction (SCR) systems. Furthermore, the exhaust system may include one or more NOx sensors that measure an amount of NOx output by the exhaust system. Thus, the one or more NOx sensors may be used as feedback to adjust engine operation (i.e. engine A/F ratio) and/or exhaust system operation (i.e. percentage of EGR) to reduce the amount of NOx in the exhaust gas.

SUMMARY

An engine system includes a position control module, a nitrogen oxide (NOx) estimation module, and a diagnostic module. The position control module changes a position of at least one of a camshaft phaser and an exhaust gas recirculation (EGR) valve based on a first nitrogen oxide (NOx) level in an exhaust gas produced by an engine. The NOx estimation module estimates an amount of NOx in the exhaust gas within a predetermined period after the change of position of at least one of the camshaft phaser and the EGR valve, wherein the estimated amount of NOx is based on a plurality of predetermined NOx amounts corresponding to a plurality of changes of position of at least one of the camshaft phaser and the EGR valve. The diagnostic module determines a state of at least one of the camshaft phaser and the EGR valve based on a predetermined threshold and a difference between the estimated amount of NOx and a second NOx level, wherein the first and second NOx levels are measured using a NOx sensor.

An engine system includes a nitrogen oxide (NOx) estimation module and a diagnostic module. The NOx estimation module estimates an amount of NOx in an exhaust gas produced by an engine based on a predetermined function of a position of at least one of a camshaft phaser and an exhaust gas recirculation (EGR) valve. The diagnostic module determines a state of at least one of the camshaft phaser and the EGR valve based on a predetermined threshold and a difference between the estimated amount of NOx and an actual amount of NOx in the exhaust gas measured by a NOx sensor.

A method includes changing a position of at least one of a camshaft phaser and an exhaust gas recirculation (EGR) valve based on a first nitrogen oxide (NOx) level in an exhaust gas produced by an engine, estimating an amount of NOx in the exhaust gas within a predetermined period after the change of position of at least one of the camshaft phaser and the EGR valve, wherein the estimated amount of NOx is based on a plurality of predetermined NOx amounts corresponding to a plurality of changes of position of at least one of the camshaft phaser and the EGR valve, and determining a state of at least one of the camshaft phaser and the EGR valve based on a predetermined threshold and a difference between the estimated amount of NOx and a second NOx level, wherein the first and second NOx levels are measured using a NOx sensor.

A method includes estimating an amount of NOx in an exhaust gas produced by an engine based on a predetermined function of a position of at least one of a camshaft phaser and an exhaust gas recirculation (EGR) valve, and determining a state of at least one of the camshaft phaser and the EGR valve based on a predetermined threshold and a difference between the estimated amount of NOx and an actual amount of NOx in the exhaust gas measured by a NOx sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Exhaust gas recirculation (EGR) may be either internal or external. More specifically, external EGR may refer to routing of exhaust gas via an external EGR system from an exhaust manifold to an intake manifold. The external EGR system may include an EGR valve that controls an amount of exhaust gas introduced (i.e. recirculated) into the intake manifold.

Figure 1A:
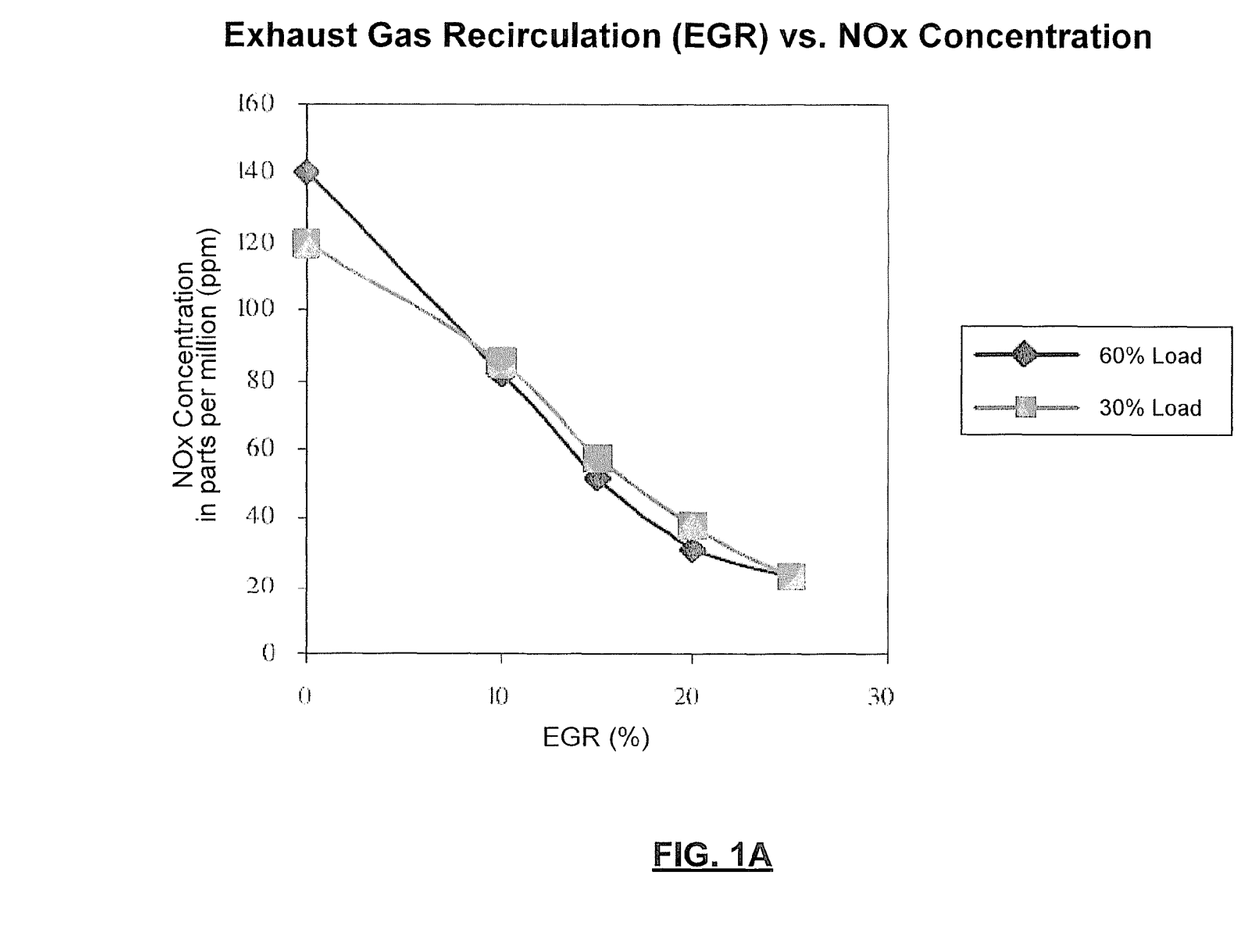
FIG. 1A is a graph illustrating exhaust gas NOx concentration with respect to varying amounts of exhaust gas recirculation (EGR)

Referring now to FIG. 1A, exhaust gas NOx concentration decreases as a percentage of EGR increases. In other words, relative position of the EGR valve may directly affect exhaust gas NOx concentration.

Internal EGR, on the other hand, may occur due to an overlap in intake and exhaust valve timing. More specifically, the overlap in intake and exhaust valve timing may result in a portion of exhaust gas produced during combustion being trapped in a cylinder after a corresponding exhaust valve is opened and subsequently closed. Thus, the portion of exhaust gas is effectively recirculated for the next combustion event.

Figure 1B:
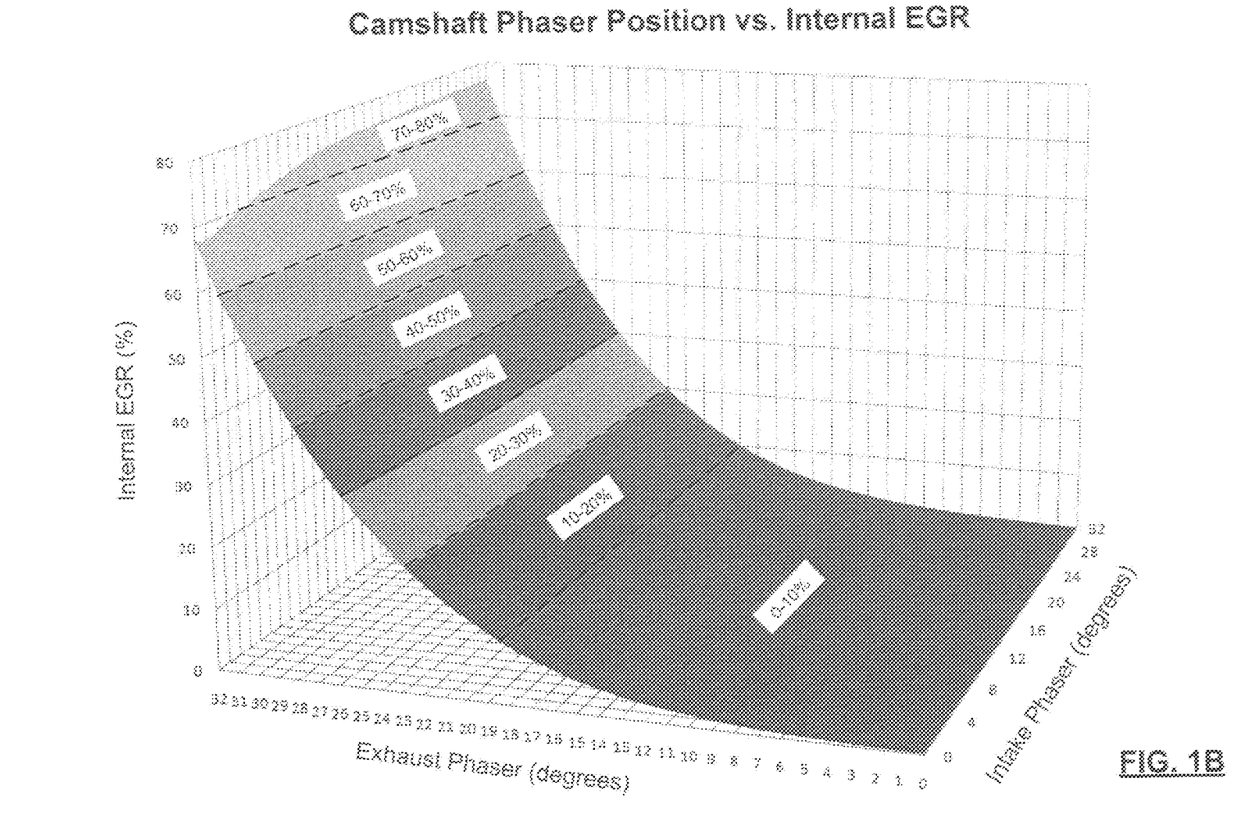
FIG. 1B is a graph illustrating amounts of internal EGR with respect to varying camshaft phaser positions.

Referring now to FIG. 1B, internal EGR increases as camshaft phaser position increases. In other words, the relative position of the camshaft phaser may directly affect internal EGR, and thus may directly affect exhaust gas NOx concentration.

As shown above, both EGR valve position and camshaft phaser position may correspond to exhaust gas NOx concentration. Therefore, exhaust gas NOx concentration may be used to determine whether one of an EGR valve (i.e. the external EGR system) and a camshaft phaser is malfunctioning (i.e. in a failure state). More specifically, a NOx sensor may measure an amount of NOx in the exhaust gas as feedback for determining whether one of the external EGR system and the camshaft phaser is in the failure state.

Figure 1C:
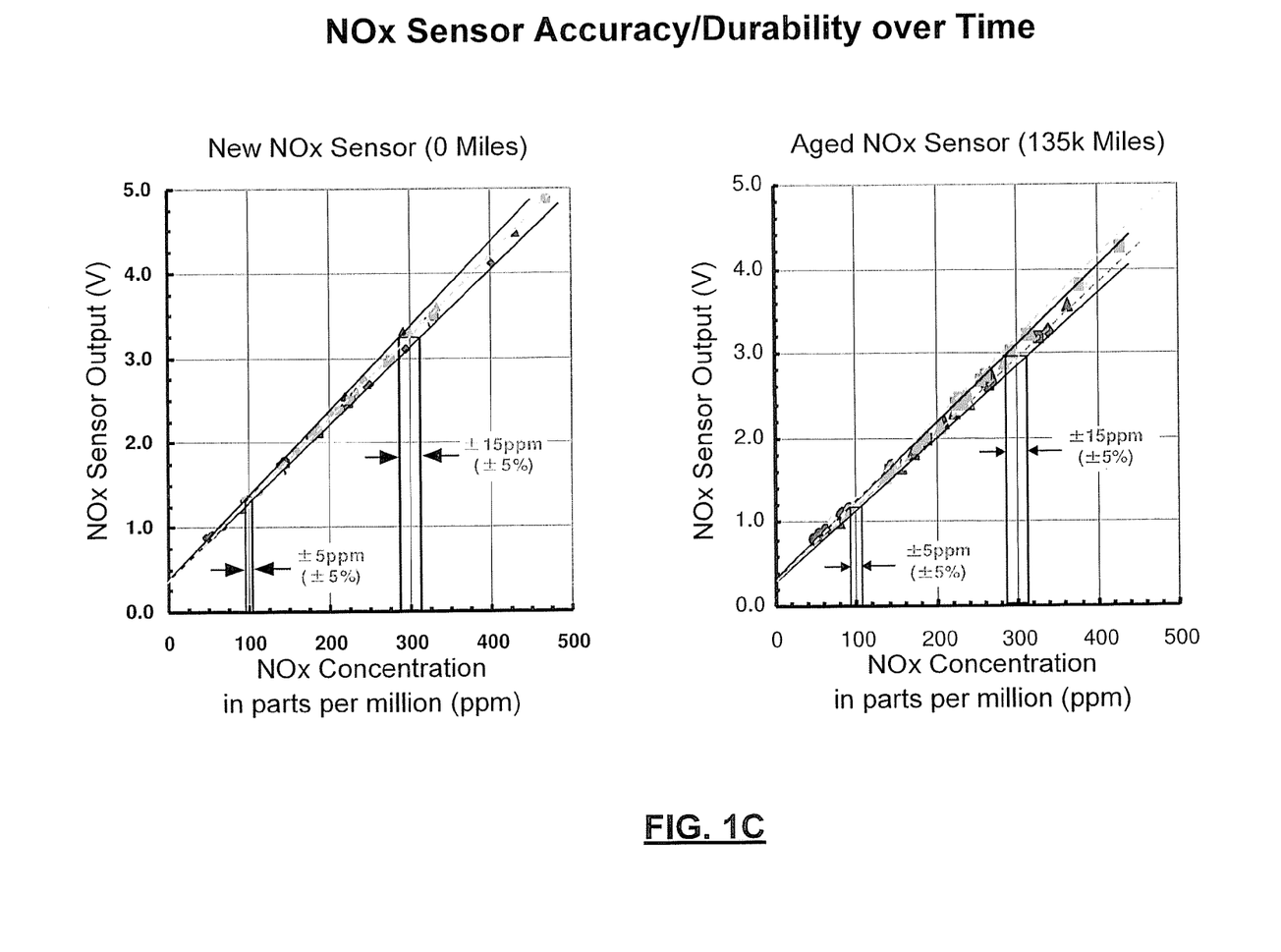
FIG. 1C is two graphs illustrating the durability and accuracy of nitrogen oxide (NOx) sensors over extended periods of operation.

Referring now to FIG. 1C, durability and accuracy of NOx sensors over an extended period of time is shown. More specifically, the NOx sensor has the same accuracy when new (+/−5%) as when aged over 135 k miles (+/−5%). Therefore, NOx sensors may be used to determine a state of one of an external EGR system and a camshaft phaser both consistently and accurately.

Therefore, systems and methods are presented that measure NOx concentration in exhaust gas produced by an engine. The measured NOx concentration may be used to determine whether one of an external EGR system and a camshaft phaser is malfunctioning (i.e. in a failure state).

In a first embodiment, the systems and methods presented determine a difference between an actual change in NOx amount measured by a NOx sensor and an expected change in NOx amount. The expected change in NOx amount may correspond to a change in position of one of an EGR valve and a camshaft position. The difference may then be compared to a predetermined threshold to determine a state of one of an external EGR system and a camshaft phaser.

In a second embodiment, the systems and methods presented determine a difference between an actual NOx amount measured by a NOx sensor and an estimated NOx amount determined using a predetermined NOx model. The predetermined NOx model may be a function of at least one of EGR valve position and camshaft position. The difference may then be compared to a predetermined threshold to determine a state of one of an external EGR system and a camshaft phaser.

Figure 2:
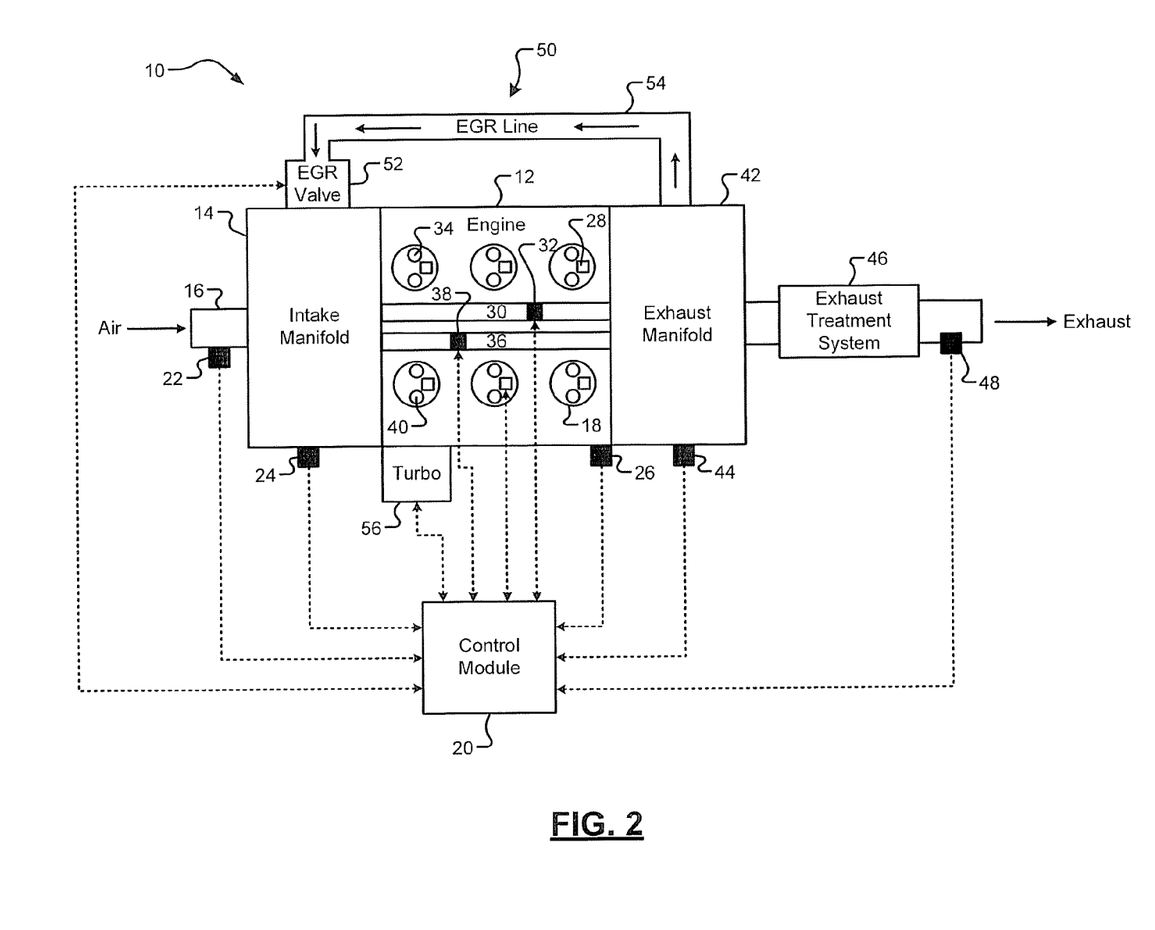
FIG. 2 is a functional block diagram of an exemplary engine system according to the present disclosure.

Referring now to FIG. 2, an engine system 10 includes an engine 12. The engine 12 combusts an air/fuel (A/F) mixture to produce drive torque. Air is drawn into an intake manifold 14 through an inlet 16. A throttle (not shown) may be included to regulate airflow into the intake manifold 14. Air within the intake manifold 14 is distributed into a plurality of cylinders 18. While six cylinders 18 are shown, it can be appreciated that the engine 12 may include other numbers of cylinders.

The engine system 10 includes a control module 20 that communicates with components of the engine system 10. For example, the components may include the engine 12, sensors, and/or actuators as discussed herein. The control module 20 may implement the systems and methods of the present disclosure.

Air is passed from the inlet 16 through a mass airflow (MAF) sensor 22. The MAF sensor 22 generates a MAF signal that indicates a rate of air flowing through the MAF sensor 22. An intake manifold absolute pressure (MAP) sensor 24 is positioned in the intake manifold 14 between the inlet 16 and the engine 12. The MAP sensor 24 generates a MAP signal that indicates air pressure in the intake manifold 14.

An engine crankshaft (not shown) rotates at an engine speed or a rate that is proportional to engine speed. A crankshaft sensor 26 senses a position of the crankshaft and generates a crankshaft position (CP) signal. The CP signal may be related to the rotational speed of the crankshaft and cylinder events. For example only, the crankshaft sensor 26 may be a variable reluctance sensor. Alternatively, the engine speed and cylinder events may be sensed using other suitable methods.

An intake valve 34 selectively opens and closes to enable air to enter the cylinder 18. An intake camshaft 30 regulates intake valve position. An intake camshaft phaser 32 controls position of the intake camshaft 30. While two camshafts 30, 36 are shown (i.e. dual overhead camshafts, or DOHC), it can be appreciated that one camshaft may be implemented (i.e. single overhead camshaft, or SOHC).

The control module 20 actuates fuel injectors 28 to inject fuel into the cylinders 18. A piston (not shown) compresses and combusts the A/F mixture within the cylinder 18. The piston drives the crankshaft during a power stroke to produce drive torque. Exhaust gas resulting from the combustion within the cylinder 18 is forced out through an exhaust manifold 42 when an exhaust valve 40 is in an open position. An exhaust camshaft 36 regulates exhaust valve position. An exhaust camshaft phaser 38 controls position of the exhaust camshaft 36.

An exhaust manifold pressure (EMP) sensor 44 generates an EMP signal that indicates pressure in the exhaust manifold 42. An exhaust treatment system 46 may treat the exhaust gas. For example only, the exhaust treatment system 46 may include at least one of a catalytic converter, an oxidation catalyst (OC), a selective catalytic reduction (SCR) system, a NOx absorber, a NOx adsorber, and a particulate matter (PM) filter. A NOx sensor 48 may generate a signal that indicates an amount of NOx in the exhaust gas downstream from the exhaust treatment system 46.

The engine system 10 may include an external EGR system 50. The EGR system 50 includes an EGR valve 52 and an EGR line 54. The EGR system 50 may introduce a portion of exhaust gas from the exhaust manifold 42 into the intake manifold 14. The EGR valve 52 may be mounted on the intake manifold 14. The EGR line 54 may extend from the exhaust manifold 42 to the EGR valve 52, providing communication between the exhaust manifold 42 and the EGR valve 52. The control module 20 may actuate the EGR valve 52 to increase or decrease an amount of exhaust gas introduced into the intake manifold 14.

The control module 20 may determine a state of one of the camshaft phasers 32, 38 and the EGR valve 52. More specifically, the control module 20 may determine whether one of the camshaft phasers 32, 38 and the EGR valve is in a failure state. The control module 20 may determine whether the camshaft phasers 32, 38 or the EGR valve is in the failure state based on NOx amounts measured by the NOx sensor 48 and one of an expected change in NOx amount and a predetermined NOx model.

The engine 12 may also include a turbocharger 56. The turbocharger 56 may be driven by the exhaust gas received through a turbine inlet. For example only, the turbocharger 56 may include a variable nozzle turbine. The turbocharger 56 increases airflow into the intake manifold 14 to cause an increase in intake manifold pressure (i.e., boost pressure). The control module 20 actuates the turbocharger 56 to selectively restrict the flow of the exhaust gas, thereby controlling the boost pressure.

Figure 3A:
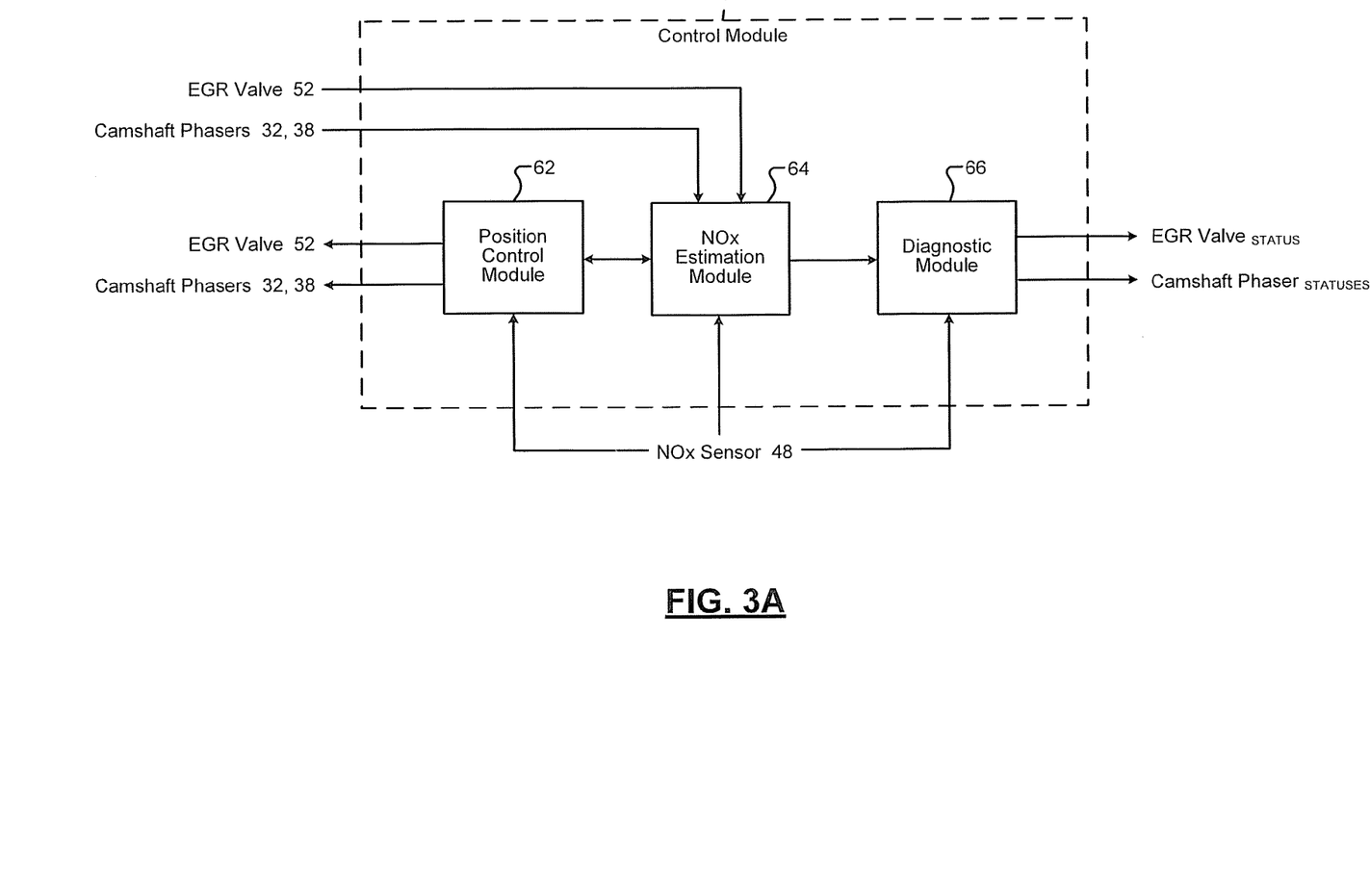
FIG. 3A is a functional block diagram of an exemplary first embodiment of a control module according to the present disclosure.

Referring now to FIG. 3A, an exemplary first embodiment 60 of the control module 20 is shown in more detail. The control module 60 may include a position control module 62, a NOx estimation module 64 and a diagnostic module 66.

The position control module 62 may change a position of one of the camshafts 30, 36 and the EGR valve 52 based on a measured amount of NOx in the exhaust gas generated by the NOx sensor 48. For example, if the measured amount of NOx is higher than emissions requirements, the position control module 62 may increase an amount of EGR. More specifically, for example, the position control module 62 may increase external EGR by opening the EGR valve 52 or the position control module 62 may increase internal EGR by increasing overlap between intake and exhaust valves 34, 40. Alternatively, the position control module 62 may change positions of both a camshaft 30, 36 and the EGR valve 52. For example, a change in position of one of the camshafts 30, 36 may be performed when an amount of EGR above a predetermined threshold is required for engine operation.

The NOx estimation module 64 may determine an expected (estimated) change in NOx amount as a result of the change in position of one of the camshafts 30, 36 and the EGR valve 52. More specifically, the NOx estimation module 64 may determine the estimated change in NOx amount based on the change in position and a plurality of predetermined NOx amounts corresponding to varying changes in position.

The diagnostic module 66 receives the estimated NOx amount from the NOx estimation module 64. The diagnostic module 66 determines a state of one of the camshaft phasers 32, 38 and the EGR valve 52 based on a predetermined threshold and a difference between the estimated change in NOx amount and an actual change in NOx amount. More specifically, the actual change in NOx amount is a difference between the NOx amount before the change in position and the NOx amount after the change in position, both of which are measured by the NOx sensor 48.

The diagnostic module 66 may determine that one of the camshaft phasers 32, 38 and the EGR valve 52 is in a failure state when the determined difference (between the estimated change in NOx amount and the actual change in NOx amount) is less than the predetermined threshold. In other words, the change in NOx amount was less than expected due to one of the camshafts 30, 36 and the EGR valve being stuck or being restricted from fully moving.

Figure 3B:
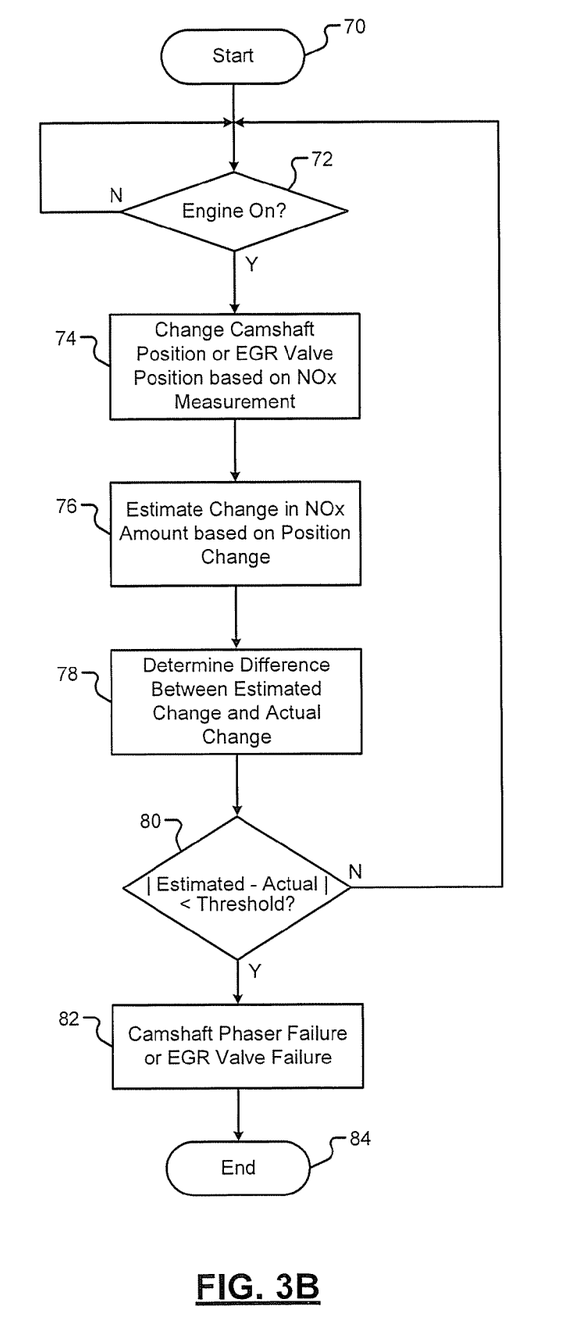
FIG. 3B is a flow diagram of a first method for determining a state of one of camshaft phasers and an exhaust gas recirculation (EGR) valve using a NOx sensor according to the present disclosure.

Referring now to FIG. 3B, a first method for determining a state of one of the camshaft phasers 32, 38 and the EGR valve 52 begins in step 70. In step 72, the control module 20 determines whether the engine 12 is operating. If true, control may proceed to step 74. If false, control may return to step 72.

In step 74, the control module 20 may change a position of one of the camshafts 30, 36 and the EGR valve 52 based on a measured amount of NOx generated by the NOx sensor 48.

In step 76, the control module 20 may estimate a change in NOx amount based on the change of position of one of the camshafts 30, 36 and the EGR valve 52.

In step 78, the control module 20 may determine a difference between the estimated change in NOx amount and an actual change in NOx amount. The actual change in NOx amount may be a difference between the NOx amount measured by the NOx sensor 48 both before and after the change in position of one of the camshafts 30, 36 and the EGR valve 52.

In step 80, the control module determines whether one of the camshaft phasers 32, 38 and the EGR valve 52 is in the failure state based on the determined difference and a predetermined threshold. More specifically, the control module 20 may determine whether the determined difference is less than the predetermined threshold. If true, control may return to step 72. If false, control may proceed to step 82.

In step 82, the control module 20 may determine that one of the camshaft phasers 32, 38 and the EGR valve 52 is in the failure state. Thus, the control module 20 may generate a failure signal or generate an error flag. Control may then end in step 84.

Figure 4A:
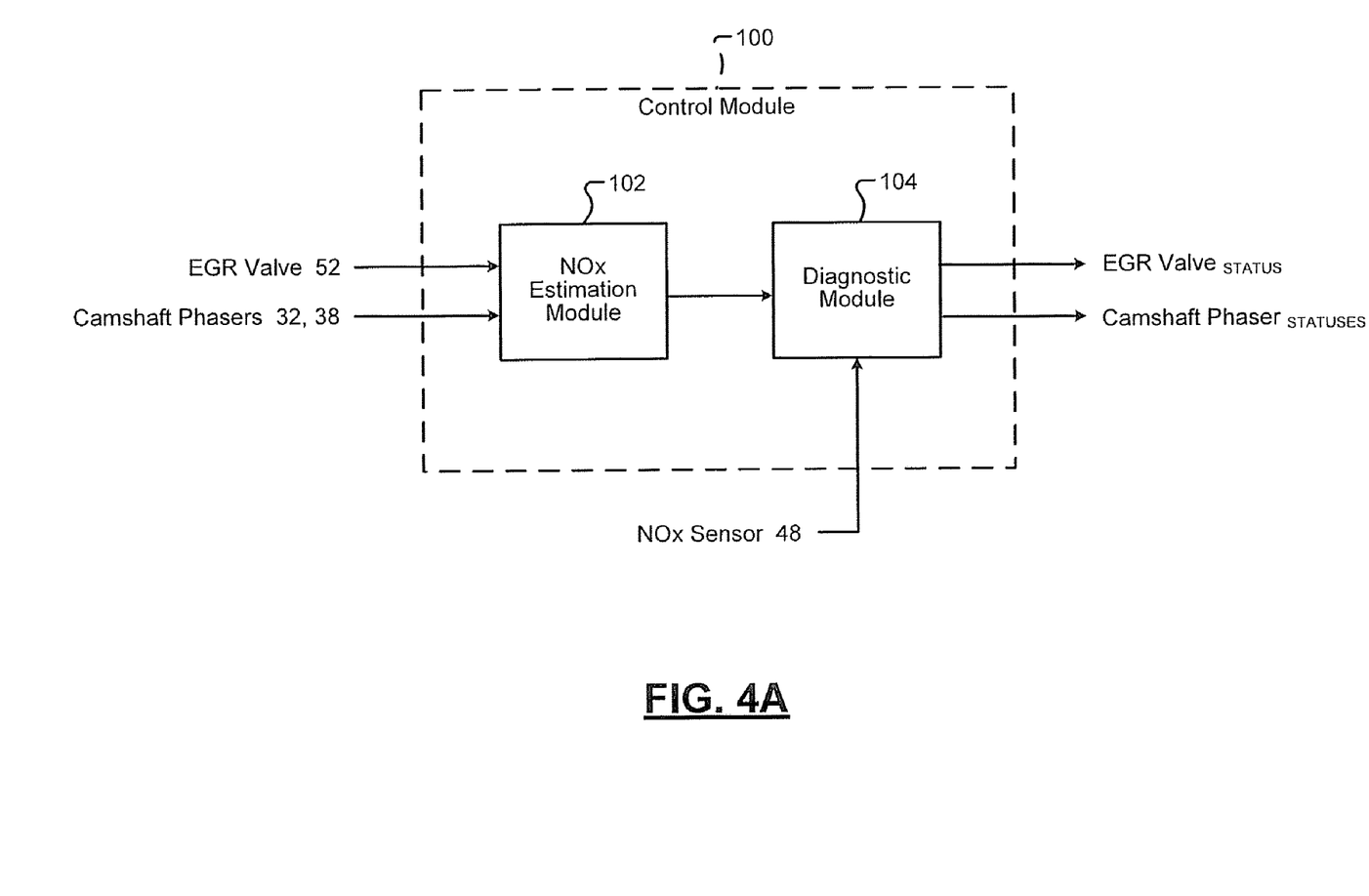
FIG. 4A is a functional block diagram of an exemplary second embodiment of the control module according to the present disclosure.

Referring now to FIG. 4A, an exemplary second embodiment 100 of the control module 20 is shown in more detail. The control module 100 may include an EGR control module 102 and a diagnostic module 104.

The NOx estimation module 102 may estimate an amount of NOx in exhaust gas produced by the engine based on a predetermined model and a position of one of the camshafts 30, 36 and the EGR valve 52. In other words, the predetermined model may be a function of position of at least one of the camshaft phasers 32, 38. For example, estimated NOx amount may increase as opening the EGR valve 52 increases or overlap between intake and exhaust valves 34, 40 increases.

The diagnostic module 104 receives the estimated NOx amount from the NOx estimation module 102. The diagnostic module 104 determines a state of one of the camshaft phasers 32, 38 and the EGR valve 52 based on a predetermined threshold and a difference between the estimated NOx amount and an actual NOx amount measured by the NOx sensor 48.

The diagnostic module 104 may determine that one of the camshaft phasers 32, 38 and the EGR valve 52 is in a failure state when the determined difference (between the estimated NOx amount and the actual NOx amount) is greater than the predetermined threshold. In other words, the estimated NOx amount was more than expected due to one of the camshafts 30, 36 and the EGR valve being stuck or being restricted from fully moving.

Figure 4B:
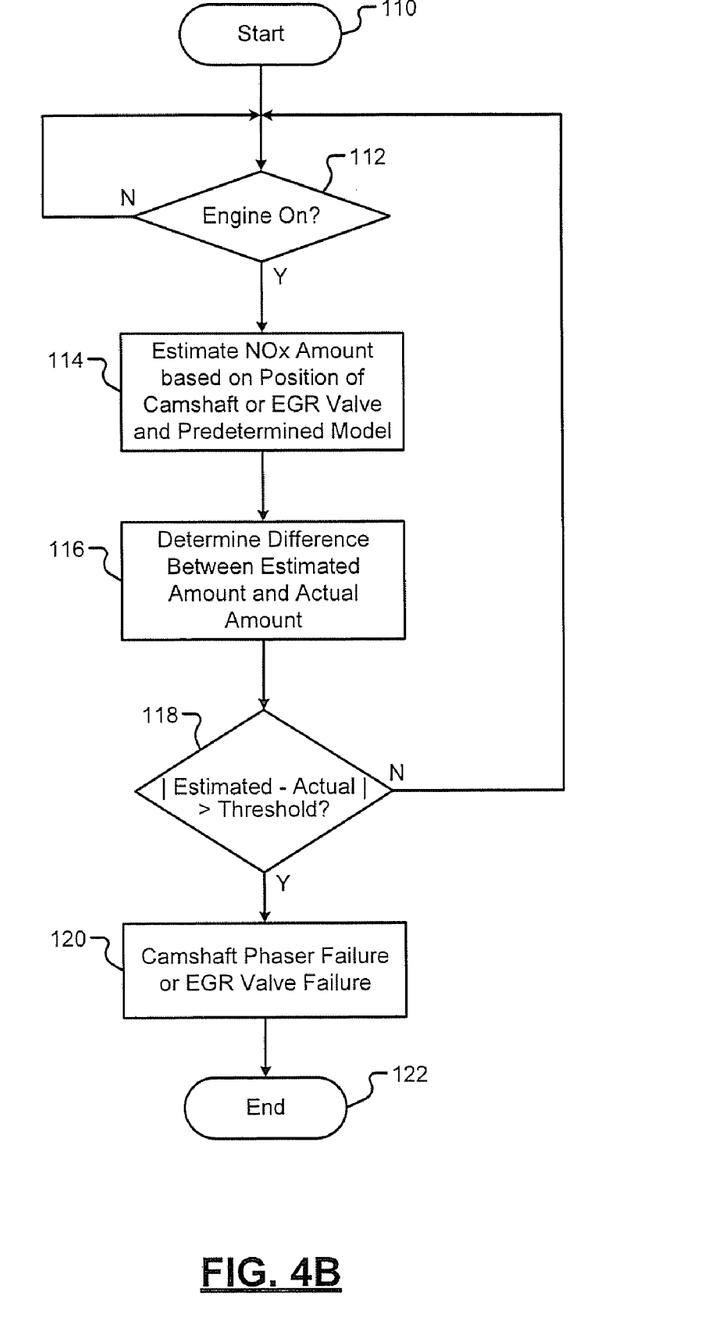
FIG. 4B is a flow diagram of a second method for determining a state of one of camshaft phasers and an EGR valve using a NOx sensor according to the present disclosure.

Referring now to FIG. 4B, a second method for determining a state of one of the camshaft phasers 32, 38 and the EGR valve 52 begins in step 110. In step 112, the control module 20 determines whether the engine 12 is operating. If true, control may proceed to step 114. If false, control may return to step 112.

In step 114, the control module 20 may estimate an amount of NOx in exhaust gas produced by the engine 12 based on a position of one of the camshafts 30, 36 and the EGR valve 52 and a predetermined model.

In step 116, the control module 20 may determine a difference between the estimated NOx amount and an actual NOx amount measured by the NOx sensor 48.

In step 118, the control module 20 may determine whether the determined difference (i.e. the absolute value) is greater than a predetermined threshold. If false, control may return to step 112. If true, control may proceed to step 120.

In step 120, the control module 20 may determine that one of the camshaft phasers 32, 38 and the EGR valve 52 is in the failure state. Thus, the control module 20 may generate a failure signal or generate an error flag. Control may then end in step 122.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system, comprising:
    a position control module that changes a position of at least one of a camshaft phaser and an exhaust gas recirculation (EGR) valve based on a first nitrogen oxide (NOx) level in an exhaust gas produced by an engine;
    a NOx estimation module that estimates an amount of NOx in the exhaust gas within a predetermined period after the change of position of at least one of the camshaft phaser and the EGR valve, wherein the estimated amount of NOx is based on a plurality of predetermined NOx amounts corresponding to a plurality of changes of position of at least one of the camshaft phaser and the EGR valve; and
    a diagnostic module that determines a state of at least one of the camshaft phaser and the EGR valve based on a predetermined threshold and a difference between the estimated amount of NOx and a second NOx level, wherein the first and second NOx levels are measured using a NOx sensor.

2. The engine system of claim 1, wherein the diagnostic module determines that at least one of the camshaft phaser and the EGR valve is in a failure state when the difference is less than the predetermined threshold.

3. The engine system of claim 1, further comprising:
    an EGR line that recirculates the exhaust gas produced by the engine to an intake manifold of the engine; and
    the EGR valve that controls an amount of recirculated exhaust gas that is introduced into the intake manifold of the engine.

4. The engine system of claim 1, further comprising:
    the NOx sensor that measures amounts of NOx in the exhaust gas produced by the engine.

5. The engine system of claim 1, wherein the position of the camshaft phaser corresponds to a period when both an intake valve and an exhaust valve of a respective cylinder are in a first state, and wherein the period corresponds to an amount of internal EGR.

6. An engine system, comprising:
    a nitrogen oxide (NOx) estimation module that estimates an amount of NOx in an exhaust gas produced by an engine based on a predetermined function of a position of at least one of a camshaft phaser and an exhaust gas recirculation (EGR) valve; and
    a diagnostic module that determines a state of at least one of the camshaft phaser and the EGR valve based on a predetermined threshold and a difference between the estimated amount of NOx and an actual amount of NOx in the exhaust gas measured by a NOx sensor.

7. The engine system of claim 6, wherein the diagnostic module determines that at least one of the camshaft phaser and the EGR valve is in a failure state when the difference is less then the predetermined threshold.

8. The engine system of claim 6, further comprising:
    an EGR line that recirculates the exhaust gas produced by the engine to an intake manifold of the engine; and
    the EGR valve that controls an amount of recirculated exhaust gas that is introduced into the intake manifold of the engine.

9. The engine system of claim 6, further comprising:
    the NOx sensor that measures amounts of NOx in the exhaust gas produced by the engine.

10. The engine system of claim 6, wherein the position of the camshaft phaser corresponds to a period when both an intake valve and an exhaust valve of a respective cylinder are in a first state, and wherein the period corresponds to an amount of internal EGR.

11. A method, comprising:
    changing a position of at least one of a camshaft phaser and an exhaust gas recirculation (EGR) valve based on a first nitrogen oxide (NOx) level in an exhaust gas produced by an engine;
    estimating an amount of NOx in the exhaust gas within a predetermined period after the change of position of at least one of the camshaft phaser and the EGR valve, wherein the estimated amount of NOx is based on a plurality of predetermined NOx amounts corresponding to a plurality of changes of position of at least one of the camshaft phaser and the EGR valve; and
    determining a state of at least one of the camshaft phaser and the EGR valve based on a predetermined threshold and a difference between the estimated amount of NOx and a second NOx level, wherein the first and second NOx levels are measured using a NOx sensor.

12. The method of claim 11, further comprising:
    determining that at least one of the camshaft phaser and the EGR valve is in a failure state when the difference is less than the predetermined threshold.

13. The method of claim 11, further comprising:
    recirculating the exhaust gas produced by the engine to an intake manifold of the engine using an EGR line; and
    controlling an amount of recirculated exhaust gas that is introduced into the intake manifold of the engine using the EGR valve.

14. The method of claim 11, further comprising:
    measuring amounts of NOx in the exhaust gas produced by the engine using the NOx sensor.

15. The method of claim 11, wherein the position of the camshaft phaser corresponds to a period when both an intake valve and an exhaust valve of a respective cylinder are in a first state, and wherein the period corresponds to an amount of internal EGR.

16. A method, comprising:
    estimating an amount of NOx in an exhaust gas produced by an engine based on a predetermined function of a position of at least one of a camshaft phaser and an exhaust gas recirculation (EGR) valve; and
    determining a state of at least one of the camshaft phaser and the EGR valve based on a predetermined threshold and a difference between the estimated amount of NOx and an actual amount of NOx in the exhaust gas measured by a NOx sensor.

17. The method of claim 16, further comprising:
    determining that at least one of the camshaft phaser and the EGR valve is in a failure state when the difference is less then the predetermined threshold.

18. The method of claim 16, further comprising:
recirculating the exhaust gas produced by the engine to an intake manifold of the engine using an EGR line; and
controlling an amount of recirculated exhaust gas that is introduced into the intake manifold of the engine using the EGR valve.

19. The method of claim 16, further comprising:
measuring amounts of NOx in the exhaust gas produced by the engine using the NOx sensor.

20. The method of claim 16, wherein the position of the camshaft phaser corresponds to a period when both an intake valve and an exhaust valve of a respective cylinder are in a first state, and wherein the period corresponds to an amount of internal EGR.

* * * * *